Figure 1:
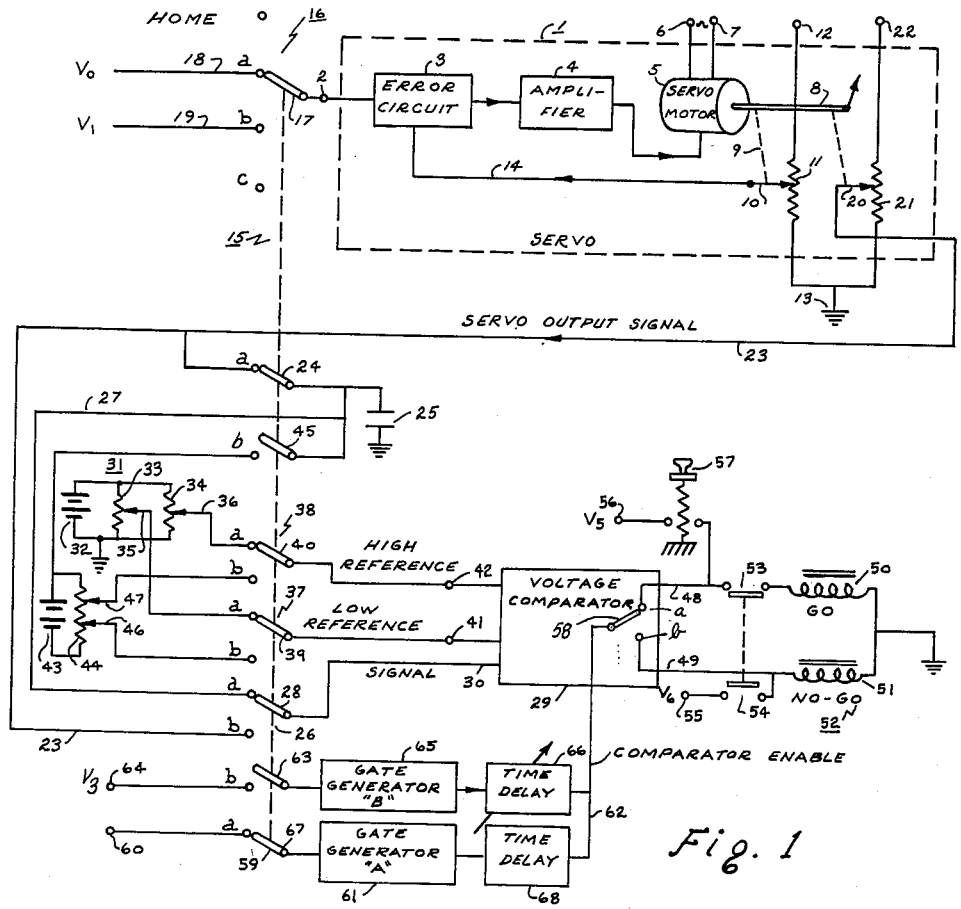

Oct. 30, 1962  C. B. BENDELL  3,061,777
TRANSIENT RESPONSE TESTING APPARATUS
Filed July 11, 1958

INVENTOR.
Curtis B. Bendell
BY
Fust & Irish
Attorneys

United States Patent Office 3,061,777
Patented Oct. 30, 1962

3,061,777
TRANSIENT RESPONSE TESTING APPARATUS
Curtis B. Bendell, Fort Wayne, Ind., assignor to International Telephone and Telegraph Corporation
Filed July 11, 1958, Ser. No. 748,069
3 Claims. (Cl. 324—57)

This invention relates generally to systems which have an output characteristic different from their input characteristic, such as servo systems, and more particularly to apparatus for testing the transient response of such systems in order to verify their dynamic behavior.

A servo system, broadly, is a system in which an input command signal, which may be either mechanical or electrical, produces a corresponding mechanical movement. Typical electrical servo systems include those employing selsyn transmitters and receivers electrically coupled together in which rotation of the shaft of the selsyn transmitter results in a corresponding rotation of the shaft of the selsyn receiver at a remote location, and the so-called closed-loop servo system in which an electrical command signal is compared with another electrical signal responsive to the output shaft position of a servo motor, the resulting error signal causing rotation of the servo motor to the desired position.

The output of most servo systems does not instantaneously correspond to the input command, i.e., there is generally an inherent time lag in the response of the system to an input command and in addition, in closed-loop servo systems utilizing an error signal, inertia of the elements of the system commonly cause several upper and lower overshoots before the output of the system reaches exact correspondence with the input command. It is therefore not only desirable that the output of the servo system, after a steady state condition has been reached, accurately correspond to the input command, but also that the dynamic response, i.e., immediately following occurrence of an input command, be within predetermined limits. It is therefore desirable to provide apparatus for testing the transient response of a servo system, or of any device having a dynamic output characteristic different from its input characteristic, such as electrical or mechanical filters. In the past, the transient response or transfer function of servo systems has been checked by making of amplitude versus frequency gain measurements, however, this prior method is not accurate due to non-linearities in the servo system. Another prior method of checking the transient response of a servo system is to observe the response on a cathode ray oscilloscope, the actual response being compared with a desired response characteristic. Here again, this method is not accurate since visual inspection is required. It is therefore desirable to provide improved apparatus for testing the transient response of a device which has a dynamic output characteristic different from its input characteristic, such apparatus providing faster and more accurate results than those obtainable by prior methods and apparatus known to the applicant. It is further desirable that such improved apparatus be adaptable for automatic testing so that a lower level of operator training is required.

It is therefore an object of this invention to provide improved apparatus for testing the transient response of a device having a dynamic output characteristic different from its input characteristic.

Another object of this invention is to provide improved apparatus for testing the transient response of a servo system.

Yet another object of this invention is to provide improved apparatus for testing the transient response of a servo system which provides faster and more accurate testing than that provided by prior apparatus and methods known to the applicant.

A still further object of this invention is to provide an improved apparatus for testing the transient response of a servo system in which the testing of each system is automatically conducted.

My invention in its broader aspects provides means adapted to be coupled to the input of the device being tested for instantaneously impressing an input signal thereon having a predetermined characteristic, such as a step-function. Means are adapted to be coupled to the output of the device being tested for sensing the output characteristic and for providing an indication in response thereto, and means are provided coupled to the sensing means for enabling the same to provide the indication a predetermined time after impression of the input signal on the device.

In accordance with the preferred embodiment of my invention, a reference input or command signal is first impressed on the device being tested and the resulting output signal, after stabilization, is compared with fixed high and low reference signals to insure that the steady state output signal is within desired limits. Memory means, such as a capacitor, is provided, arranged to store the initial or reference output signal. The impression of an initial or reference command on the device and the storage of the resulting output signal eliminates tolerance and alignment errors in the initial position of the device and permits a subsequent accurate transient check. Following impression of the initial or reference command signal, a second command signal having a predetermined characteristic, such as a step-function, is impressed on the device and at this time, the signal stored in the memory device is added to floating high and low reference signals with the output signal resulting from the second command signal being compared against these floating reference signals. A sensing means, which may be a comparator, is arranged to provide, in response to an enabling signal, an indication that the output signal from the device being tested is within or outside of the reference signals. This enabling signal is provided by a time delay device, the time delay being initiated coincidentally with impression of the second command signal on the device being tested. Thus, the sensing means is enabled to provide an output indication a predetermined period of time after impression of the desired command signal on the device being tested. My apparatus can therefore be employed for such purposes as checking the rise time of the output response of the device, which may be accomplished by determining whether the output signal has risen to a value within predetermined limits after a predetermined time. The apparatus can further be employed to check the amplitude of a first, second, or any successive overshoot of the output response characteristic merely by appropriate selection of the delay time of the enabling signal and the limits of the floating reference signals, and the amount of damping of the output signal can similarly be determined.

Figure 2:
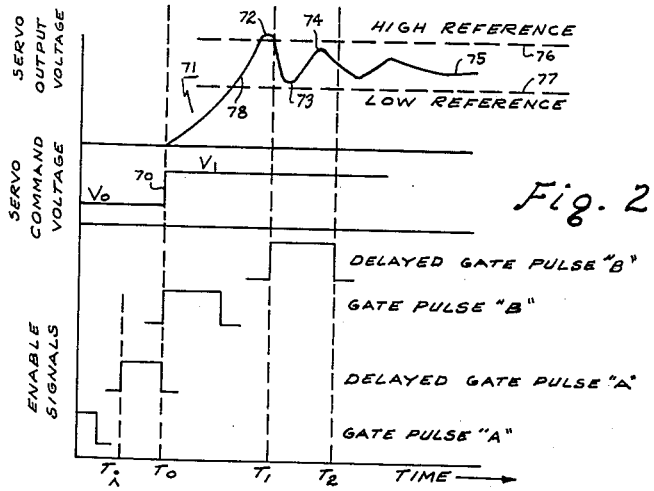

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic illustration of the preferred embodiment of my invention employed in checking the transient response of a closed-loop electrical servo system; and FIG. 2 is a chart showing the relationship of the various signals in the system.

Referring now to FIG. 1, there is shown a typical closed-loop servo system 1 having an input terminal 2 coupled to an error circuit 3 which in turn is coupled to the input of an amplifier 4. The output of the amplifier 4 is in turn coupled to the signal input of servo motor 5 which has a suitable alternating current carrier applied thereto by means of terminals 6 and 7. The output shaft 8 of the servo motor 5 is coupled, as at 9 to the movable element 10 of a potentiometer 11 which has one end connected to terminal 12 which in turn is connected to a suitable source of direct current potential, and its other end connected to ground 13, as shown. Movable element 10 of potentiometer 11 is in turn connected to the error circuit 3 by means of conductor 14 as shown. It will be readily understood that the particular servo system 1 shown diagrammatically in FIG. 1 does not form a part of my invention, and that other types of electrical and mechanical servo systems may be equally advantageously tested by my improved transient response testing apparatus.

In accordance with my invention, I provide a plural position switch 15, such as a multi-level stepping switch, and having a first switch element 16 with a movable contact member 17 adapted to be connected to the input terminal 2 of the particular servo system 1 being tested and adapted to make contact with a plurality of switch positions, being here shown and identified as "home" and "a," "b" and "c." Position "a" of switch element 16 is adapted to be connected to a suitable source of reference potential, identified as $V_0$ by conductor 18 while switch position "b" is adapted to be connected to another source of suitable potential, identified as $V_1$ by conductor 19.

The output shaft 8 of the servo motor 5 is coupled to the movable element 20 of another potentiometer 21 which has one end connected to terminal 22 which in turn is adapted to be connected to a suitable source of direct current potential, and its other end connected to ground 13 as shown. It will be readily seen that the position of shaft 8 of the servo motor 5 in turn determines the position of the movable element 20 and thus the voltage selected by the movable element 20 of the potentiometer 21 is responsive to the position of the shaft 8 of servo motor 5. Movable element 20 of potentiometer 21 is connected by a conductor 23 to switch element 24 of the step switch 15. Switch element 24 is closed in its position "a" thereby connecting conductor 23 to capacitor 25 which in turn is connected to ground as shown. Conductor 23 is also connected to the position "b" of switch element 26 of step switch 15 while position "a" of switch element 26 is connected to the side of capacitor 25 remote from ground by means of conductor 27. Movable element 28 of switch 26 is connected to the signal input circuit of voltage comparator 29 by means of conductor 30. Voltage comparator 29 is of the type which compares the input signal with upper and lower reference signals to provide an output indication of whether the input signal is within or outside of the two reference signals. While any suitable fast responding voltage comparator may be employed for this purpose, a comparator comprising two null-balance indicators of the type shown in Patent 2,632,868 of K. H. Barney, for respective connection to the upper and lower reference voltages may be used, and the comparator described in co-pending application Serial Number 795,824, filed February 26, 1959, of D. L. Spooner is also quite suitable for this application.

In order to provide the high and low reference voltages for the comparator 29, a first reference voltage source 31 shown here as including a battery 32 is provided with potentiometers 33 and 34 connected across battery 32 and with the negative side of the battery being grounded, as shown. Movable elements 35 and 36 of potentiometers 33 and 34 are respectively connected to positions "a" of switch elements 37 and 38 of step switch 15. The movable contacts 39 and 40 of switch elements 37 and 38 are respectively connected to the low and high reference voltage input terminals 41 and 42 of the comparator 29. Another source of high and low reference voltages is provided, shown here as a battery 43 having potentiometer 44 connected thereacross. Here, the positive side of battery 43 is connected to the side of capacitor 25 remote from ground by switch element 45 of stepping switch 15 which is closed in its "b" position as shown. Potentiometer 44 is provided with two movable elements 46 and 47 connected respectively to the "b" positions of switch elements 37 and 38.

Voltage comparator 29 is provided with output circuits 48 and 49, these being respectively the "go" and "no-go" output indication circuits. Output circuit 48 has operating coil 50 of step switch 15 connected therein while the output circuit 49 has operating coil 51 of no-go lock out relay 52 connected therein. No-go lock out relay 52 has a normally closed contact 53 serially connected with the operating coil 50 of step switch 15, and a normally open contact 54 which serves to connect operating coil 51 of no-go lock out relay 52 to a suitable source of potential connected to terminal 55. Another suitable source of potential is connected to terminal 56 and in turn to the output circuit 48 of comparator 29 by a suitable push button 57.

Voltage comparator 29 has an enabling circuit including a suitable contact 58 which is actuated by the comparator circuitry to its "a" (go) or "b" (no-go) position dependent upon whether the signal is or is not between the high and low references. Step switch 15 is provided with another switch element 59 which in its "a" position connects terminal 60, which in turn is connected to a suitable source of potential, to energize gate generator 61. Gate generator 61 has its output circuit connected to time delay circuit 68, which in turn is connected to enable the contacts 58 of voltage comparator 29 by means of conductor 62. The contacts 58 in turn connect enable circuit 62 to the "go" and "no-go" output circuits 48 and 49. Switch element 63 of stepping switch 15 in its "b" position connects terminal 64, which in turn is connected to a suitable source of potential, to gate generator 65 which in turn has its output circuit connected to the input circuit of a suitable variable time delay circuit 66, which in turn has its output circuit connected to the contacts 58 by means of conductor 62.

It will be readily understood that in the event that the switch 15 is a stepping switch, each of the switch elements 16, 24, 26, 37, 38, 45, 59 and 63 will have "home," "a," "b," and "c" positions, and presumably other switch positions which are not employed in the present circuit. Thus, it will be understood that while only the switch element 16 is shown as including the "home," "a," "b" and "c" positions, the other switch elements also include these positions, however, only the effective positions of the other switch elements have been shown for purposes of simplicity. It will also be understood that the stepping switch 15 may be of the type in which its operating coil 50, when initially energized, "cocks" the switch, subsequent deenergization of the coil permitting the switch to advance to its next position. Thus, testing of the servo system 1 with the apparatus shown in FIG. 1 is accomplished by momentarily depressing push button 57 which connects a suitable source of potential to energize operating coil 50 of stepping switch 15 through normally closed contact 53 of a no-go lock out relay 52. Release of the push button 57 thus deenergizes operating coil 50 of the stepping switch 15 and causes the switch to advance from its "home" to its "a" position, i.e., the position shown in FIG. 1.

Referring now to FIG. 2 in addition to FIG. 1, connection of movable contact 17 of switch element 16 to its "a" position connects initial or reference command voltage $V_0$ to the servo system 1 and likewise, movement of movable contact 67 of switch element 59 to its "a" position connects the potential coupled to input terminal 60 to the gate generator 61 which thereby initiates enabling or gate pulse A. Gate pulse A is fed to time delay means 68 where it is delayed for a predetermined time and then fed to the enable circuit 62 of the comparator 29.

Coincidentally with advance of stepping switch elements 16 and 59 to their positions "a," switch element 24 is likewise advanced to its position "a" thus connecting capacitor 25 between ground and the movable element 20 of potentiometer 21 so that it assumes a voltage selected by the movable element 20 of potentiometer 21 which in turn is proportional to the position of shaft 8 of the servo motor 5. Switch element 26 has likewise simultaneously moved to its position "a" so that the output signal from the movable element 20 of potentiometer 21 is also fed through switch element 24, conductor 27, and switch element 26 to voltage comparator 29. Switch elements 37 and 38 have simultaneously moved to their positions "a" thus connecting movable elements 35 and 36 of potentiometers 33 and 34 to the high and low reference voltage input terminals 41 and 42 of the voltage comparator 29. The output signal from the potentiometer 21 is thus compared by the voltage comparator 29 with the high and low reference voltages selected from the fixed voltage reference source 31. The time delay provided by the time delay circuit 68 is made sufficiently long so that by the time "$t_1$" when gate pulse A from gate generator 61 is applied to conductor 62 and contact 58 of voltage comparator 29, the output signal from the servo system 1 has stabilized, i.e., the transient overshoots have been dampened. Thus, if the output signal selected by the movable element 20 of potentiometer 21 coupled to output shaft 8 of servo motor 5 is within the predetermined voltage limits selected by the movable elements 35 and 36 of potentiometers 33 and 34 connected across fixed reference voltage battery 32, output circuit 48 of comparator 29 will be energized thus in turn energizing the operating coil 50 of the step switch 15 through the normally closed contact 53 of the no-go lock out relay 52. Gate pulse A may be comparatively short, as shown in FIG. 2, and at time $t_0$ when the gate pulse A impressed on the contact 58 of the comparator 59 is terminated, operating coil 50 of step switch 15 will be deenergized thus causing the switch elements of such step switch 15 to advance to their "b" positions.

In its "b" position, movable contact 17 of switch element 16 instantaneously connects input voltage $V_1$ to the input terminal 2 of the servo system 1. Referring to FIG. 2, it is here assumed that input voltage $V_1$ is higher than reference voltage $V_0$ by a predetermined amount, and thus, sudden switching from position "a" to position "b" of switch element 16 will provide the step-function input applied to the servo system 1 as shown. Advance of the step switch 15 to its position "b" closes switch element 63 thereby to impress the voltage $V_3$ on the gate generator 65 to initiate gate pulse B at time $t_0$. Switch element 24 is open in its "b" position thus disconnecting capacitor 25 from the movable element 20 of potentiometer 21. Switch element 45 is, however, closed in the "b" position and it is thus seen that capacitor 25 is now connected to the positive side of reference voltage source battery 43; reference voltage source 43 is floating, i.e., it is not connected to ground, and thus connection of capacitor 25 to battery 43 by switch element 45 in its "b" position essentially adds the voltage previously impressed on capacitor 25 to the voltage of battery 43.

Switch element 26 is now moved to its "b" position thus directly connecting the signal input of voltage comparator 29 to the movable element 20 of potentiometer 21 by means of conductors 23 and 30, and switch elements 37 and 38 have also simultaneously moved to their "b" positions disconnecting reference voltage source 31 from the reference voltage input terminals 41 and 42 of comparator 29 and connecting reference voltage source 43 thereto; sliding elements 46 and 47 of potentiometer 44 are now connected to the low and high reference voltage input terminals 41 and 42 of comparator 29 by means of movable contacts 39 and 40 of switch elements 37 and 38.

Thus, the output signal from potentiometer 21 responsive to the position of shaft 8 of servo motor 5 is now compared by the comparator 29 against high and low reference voltages which are added to a charge stored in capacitor 25 which in turn was initially responsive to the initial or reference command applied to the servo system.

Application of the step-function 70 to the input of the servo system 1 provides a response characteristic 71, as selected from potentiometer 21 by movable element 20, the inertia of the elements of the servo system causing successive overshoots 72, 73, 74, etc. in the response characteristic until the output signal finally stabilizes at level 75 corresponding to the position of output shaft 8 of servo motor 5 which in turn was commanded by input command signal $V_1$. Assuming now that it is desired to determine whether the second and third overshoots 73 and 74 are within desired limits, the high and low reference voltages provided by reference voltage source 43 are set respectively at levels 76 and 77 as shown in FIG. 2, and the time delay provided by time delay circuit 66 is adjusted so that the gate pulse B provided by gate generator 65 is applied to the enable circuit 62 of the voltage comparator 29 at time $t_1$, which it will be observed occurs immediately after the first overshoot 72 in the output signal response characteristic. Thus, at the end of the predetermined time delay $t_1$, delayed gate pulse B is applied to the enable circuit 62 of comparator 29 and in the event that second and third overshoots 73 and 74 do not exceed the high and low reference levels 76 and 77, operating coil 50 of step switch 15 will be energized. However, if at any point prior to termination of the enabling gate pulse B at time $t_2$, the output signal as sensed by the comparator 29 exceeds the high reference level 76 or is below the low reference level 77, no-go lock out relay 52 will be energized thus opening contact 53 preventing subsequent energization of operating coil 50 of stepping switch 15 and closing contact 54 connecting voltage $V_6$ to operating coil 51 of no-go lock out relay 52 thus sealing itself in to the voltage $V_6$ and preventing subsequent advance of the stepping switch 15. The duration of the gate pulse B provided by the gate generator 65 is selected to provide the desired interval between the times $t_1$ and $t_2$ and it will be observed that on termination of the delayed gate pulse B at time $t_2$, the enabling signal on the enable circuit 62 of voltage comparator 29 is removed. If the no-go lock out relay 52 has been energized during the interval between $t_1$ and $t_2$, removal of enabling signal will have no effect since the no-go lock out relay 52 will have been sealed in through its own contact 54 on the voltage $V_6$. However, if the go circuit 48 has been energized and operating coil 50 of stepping switch 15 likewise energized, removal of the enabling gate pulse B from the contact 58 of the voltage comparator 29 deenergizes operating coil 50 and thus causes stepping switch 15 to advance to its "c" position, the particular dynamic test of the servo system 1 having been completed; other tests on the servo system 1 may be accomplished in the position "c" of the step switch 15.

It will now be seen that if it is desired to check the rise time 78 of the response characteristic 71 of the servo system 1, it is merely necessary to adjust the time delay provided by the time delay circuit 66 so that the time $t_1$ when the gate pulse B is applied to the contact 58 of voltage comparator 29 occurs prior to the first overshoot 72 and likewise to adjust the high and low reference levels 76 and 77 provided by the floating reference source 43 to the desired level. Likewise, the amplitude of any particular overshoot 72 through 74 can be checked by merely adjusting the occurrence of the time $t_1$ and the duration of the gate pulse B which in turn determines the time $t_2$.

It will be readily understood that if the initial or reference input voltage on the servo system 1 calls for a position of output shaft 8 of servo motor 5 represented by a zero voltage selected by movable element 20 of potentiometer 21, the memory capacitor 25 may be eliminated and the reference voltage source 43 fixed with respect to ground. It will also be readily seen that electrical and mechanical servo systems other than the type shown in FIG. 1, together with electrical and mechanical filter systems may be equally advantageously tested by my improved apparatus. It will also be seen that memory devices other than the capacitor 25 may be equally advantageously employed for storing a signal responsive to the initial shaft position thereby to eliminate tolerance in the initial reference shaft position and other errors such as potentiometer alignment errors. It will also be seen that functions other than a step function may be applied to the servo system or other device being tested, e.g., impulse, ramp, or exponential function. It will also be readily seen that a switching function may be accomplished by devices other than the stepping switch, it being merely necessary that the changes in connection from position "a" to position "b" be effected simultaneously. It will further be seen that sample level references may be used by inserting suitable electrical shaping networks subsequent to reference arms 46 and 47 or 35 or 36.

While I have described above the principles of my invention in connection with specific apparatus, it is to be clearly understood that this description is made only by way of example and not as a limitation to the scope of my invention.

What is claimed is:

1. Apparatus for testing the transient response to an input signal having a predetermined characteristic of a device which has a dynamic output characteristic different from its input characteristic comprising: first switching means adapted to be coupled to the input of the device to be tested and having a first position for impressing a reference input signal on said device and a second position for instantaneously impressing a second input signal having a predetermining characteristic on said device; memory means; second switching means operatively coupled to said first switching means and adapted to couple said memory means to the output of said device in the first position of said first switch means whereby said memory means stores a signal corresponding to the output signal of said device responsive to the reference input signal; comparator means adapted to be coupled to the output of said device for comparing the output signal thereof with upper and lower reference signals and for providing indications when said output signal is respectively within or outside of said upper and lower reference signals responsive to an enabling signal; a first source of upper and lower reference signals; third switching means operatively coupled to said first switching means for coupling said first source of reference signals to said comparator means when said first switching means is in said first position thereof; a second source of upper and lower reference signals; fourth switching means operatively coupled to said first switching means for coupling said second source of reference signals to said memory means and to said comparator means in said second position of said first switching means; time delay means coupled to said comparator for providing an enabling signal thereto; and fifth switching means operatively coupled to said first switching means for impressing a signal on said time delay means coincidentally with impression of said second input signal on said device whereby said comparator means is enabled to provide said indications after a predetermined time delay provided by said time delay means.

2. Apparatus for testing the transient response of a servo system comprising: means adapted to be coupled to the input of the servo system to be tested for impressing a reference input command thereon; means adapted to be coupled to the input of said servo system for impressing a step-function input command thereon of predetermined magnitude, said servo system including means providing an output signal voltage responsive to the input command thereon; a capacitor adapted to be coupled to said servo system output signal voltage means for storing the output signal voltage therefrom responsive to said reference input command; a voltage comparator adapted to be coupled to said servo system output signal voltage means for comparing said output signal voltage with high and low reference voltages, said voltage comparator including means for providing indications when said output signal is within or outside of said high and low reference voltages responsive to an enabling signal; high and low reference voltage source means adapted to be coupled to said voltage comparator when said reference input command is impressed on said servo system; means adapted additionally to couple said reference voltage source means to said capacitor when said step-function command is impressed on said servo system whereby the charge on said capacitor is added to said reference voltage source means; time delay means coupled to said comparator enabling means; and means adapted to be coupled to said time delay means for impressing a signal thereon coincident with said impression of said step-function command on said servo system whereby said comparator is enabled to provide said indications after a predetermined time delay provided by said time delay means.

3. Apparatus for testing the transient response of a servo system comprising: first plural positions switching means adapted to be coupled to the input of said servo system and having a first position for impressing a reference input command on said servo system and a second position for impressing a step-function input command of predetermined magnitude on said servo system; said servo system including means for providing an output signal voltage responsive to the input command thereon; a capacitor; second plural position switching means operatively coupled to said first switching means and adapted to couple said capacitor to said output signal voltage providing means when said first switching means is in said first position thereof; a voltage comparator adapted to be coupled to said output signal voltage providing means for comparing said output signal voltage with high and low reference voltages, said comparator having two output circuits for respectively providing indications when said output signal voltage is within or outside of said reference voltages, said comparator having means for energizing said output circuits responsive to an enabling signal; a first source of high and low reference voltages; a second source of high and low reference voltages; third plural position switching means operatively coupled to said first switching means and having a first position coupling said comparator to said first reference voltage source when said first switching means is in said first position thereof and having a second position coupling said comparator to said second reference voltage source when said first switching means is in said second position thereof; fourth plural position switching means operatively coupled to said first switching means and arranged to couple said capacitor to said second reference voltage source when said first switching means is in said second position thereof whereby the charge on said capacitor is added to said second high and low reference voltages; time delay means coupled to said comparator enabling means; fifth plural position switching means coupled to said time delay means and operatively coupled to said first switching means and adapted to impress an input signal on said time delay means coincidentally with impression of said step-function command on said servo system, said time delay means being arranged to provide an enabling signal to said comparator enabling means having a predetermined duration and a predetermined time delay from said step-function command thereby enabling said comparator to provide said indications; and means coupled in the comparator output circuit which provides an indication that said output signal is within said reference voltages and operatively coupled to all of said switching means and arranged to advance the same to another position responsive to termination of said enabling signal.

References Cited in the file of this patent

UNITED STATES PATENTS

| | | |
|---|---|---|
| 2,633,019 | Albrecht | Mar. 31, 1951 |
| 2,625,599 | Downes | Jan. 13, 1953 |
| 2,837,718 | Catherall | June 3, 1958 |
| 2,922,950 | Douglass | Jan. 26, 1960 |
| 2,970,260 | Flint | Jan. 31, 1961 |

OTHER REFERENCES

"Go, No-Go Gage Checks Out BOMARC Automatically," article in Electronics, engineering edition, July 4, 1958; pages 43–45.

UNITED STATES PATENT OFFICE
CERTIFICATE OF CORRECTION

Patent No. 3,061,777                                                  October 30, 1962

Curtis B. Bendell

It is hereby certified that error appears in the above numbered patent requiring correction and that the said Letters Patent should read as corrected below.

Column 7, line 36, for "predetermining" read -- predetermined --.

Signed and sealed this 2nd day of April 1963.

(SEAL)
Attest:

ESTON G. JOHNSON                                        DAVID L. LADD

Attesting Officer                                              Commissioner of Patents